United States Patent
Rahman

(10) Patent No.: US 8,089,886 B1
(45) Date of Patent: Jan. 3, 2012

(54) METHOD AND APPARATUS FOR DETECTING AND REPORTING TIMEOUT EVENTS

(75) Inventor: Moshiur Rahman, Marlboro, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 475 days.

(21) Appl. No.: 11/751,815

(22) Filed: May 22, 2007

(51) Int. Cl.
*H04L 12/26* (2006.01)

(52) U.S. Cl. ........................................ 370/242

(58) Field of Classification Search .............. 370/396, 370/401, 242, 216–221, 254; 709/223, 224
See application file for complete search history.

(56) References Cited

U.S. PATENT DOCUMENTS

| | | | |
|---|---|---|---|
| 7,046,680 B1 * | 5/2006 | McDysan et al. | 370/396 |
| 7,050,390 B2 * | 5/2006 | Woodall | 370/217 |
| 7,221,928 B2 * | 5/2007 | Laird et al. | 455/404.1 |
| 7,505,567 B1 * | 3/2009 | Eslambolchi et al. | 379/14.01 |
| 2005/0076235 A1 * | 4/2005 | Ormazabal et al. | 713/201 |
| 2007/0019563 A1 * | 1/2007 | Ramachandran et al. | 370/252 |
| 2007/0019625 A1 * | 1/2007 | Ramachandran et al. | 370/352 |
| 2008/0025294 A1 * | 1/2008 | Elliott et al. | 370/356 |
| 2008/0025295 A1 * | 1/2008 | Elliott et al. | 370/356 |
| 2008/0062863 A1 * | 3/2008 | Ginde | 370/221 |
| 2008/0117816 A1 * | 5/2008 | Stone et al. | 370/230.1 |
| 2009/0158098 A1 * | 6/2009 | Rahman | 714/57 |

* cited by examiner

*Primary Examiner* — Chi Pham
*Assistant Examiner* — Robert Lopata

(57) ABSTRACT

A method and apparatus for processing timeout events in a packet network are disclosed. For example, the method detects a timeout event by a first network element, wherein the timeout event is generated due to a lack of response from a second network element. The method then determines whether a threshold for reporting of timeouts is exceeded for the second network element. The method then generates a report by the first network element to a fault management system if the threshold is exceeded, where the report indicates that the second network element has exceeded the threshold for reporting of timeouts.

20 Claims, 4 Drawing Sheets

200

METHOD AND APPARATUS FOR DETECTING AND REPORTING TIMEOUT EVENTS

The present invention relates generally to communication networks and, more particularly, to a method for detecting and reporting timeout events in a packet network, e.g., a Voice over Internet Protocol (VoIP) network.

BACKGROUND OF THE INVENTION

Internet services such as Voice over Internet Protocol (VoIP) and Service over Internet Protocol (SoIP) services are becoming ubiquitous and more and more businesses and consumers are relying on their Internet connections for both data and voice communications needs. Customers expect to receive a high quality of service regardless of the type of network used to provide the service. However, calls may fail to be established and simply timeout. The timeout in signaling may be due to a fault in the network. Currently, the customer is expected to redial (i.e., send another request) when his/her request times out. However, if the timeout is due to a network fault, the outcome of subsequent redialing may not change and the service provider may not even be aware of the customer's experience. Frequent timeouts may decrease customer satisfaction with the service.

SUMMARY OF THE INVENTION

In one embodiment, the present invention discloses a method and apparatus for processing timeout events in a packet network. For example, the method detects a timeout event by a first network element, wherein the timeout event is generated due to a lack of response from a second network element. The method then determines whether a threshold for reporting of timeouts is exceeded for the second network element. The method then generates a report by the first network element to a fault management system if the threshold is exceeded, where the report indicates that the second network element has exceeded the threshold for reporting of timeouts.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing detection and reporting of timeout events in a packet network, e.g., a Voice over Internet Protocol (VoIP) network. Although the present invention is discussed below in the context of a VoIP network, the present invention is not so limited. Namely, the present invention can be applied for other packet networks.

Figure 1:
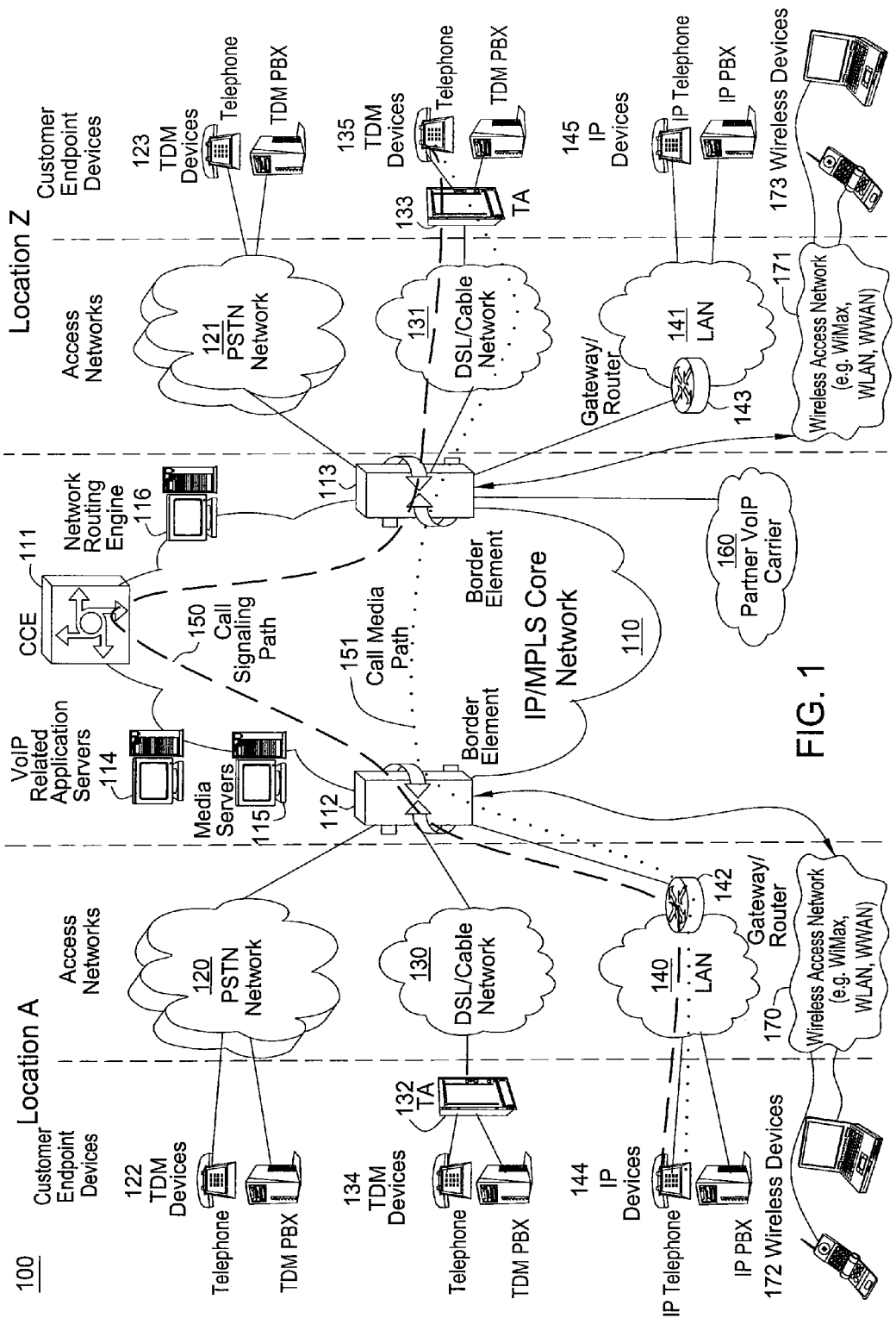
FIG. 1 illustrates an exemplary network related to the present invention.

To better understand the present invention, FIG. 1 illustrates an example network, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network is considered an IP network.

In one embodiment, the VoIP network may comprise various types of customer endpoint devices connected via various types of access networks to a carrier (e.g., a service provider) VoIP core infrastructure over an Internet Protocol/Multi-Protocol Label Switching (IP/MPLS) based core backbone network. Broadly defined, a VoIP network is a network that is capable of carrying voice signals as data packets over an IP network. The present invention is described below in the context of an illustrative VoIP network. Thus, the present invention should not be interpreted as limited by this particular illustrative architecture.

The customer endpoint devices can be Time Division Multiplexing (TDM) based, IP based or wireless such as cellular phones. TDM based customer endpoint devices 122, 123, 134, and 135 typically comprise of TDM phones or Private Branch Exchange (PBX). IP based customer endpoint devices 144 and 145 typically comprise IP phones or IP PBX. Wireless endpoint devices 172 and 173, typically comprise cellular phones, pocket PCs etc. The Terminal Adaptors (TA) 132 and 133 are used to provide necessary inter-working functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 which has a VoIP gateway router 142 or 143, as shown in FIG. 1. Wireless endpoint devices may access VoIP services by using wireless access networks 170 and 171. The wireless access networks 170 and 171 are connected to the IP core network 110 through the border elements 112 and 113, respectively.

The access networks for wired devices can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices. The access networks for wireless devices 170 and 171 can be Worldwide Interoperability for Microwave Access (WiMax), Wireless Local Area Networks (WLAN) or Wireless Wide Area Networks (WWAN).

The core VoIP infrastructure comprises of several key VoIP components, such as the Border Elements (BEs) 112 and 113, the Call Control Element (CCE) 111 (broadly interpreted as containing a Call Session Control Function (CSCF)), VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a soft-switch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoint devices the CCE 111 does not need to be in the data path for actual direct data exchange.

Media Servers (MS) 115 are special servers that typically handle and terminate media streams, and to provide services such as announcements, bridges, trans-coding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported on packet networks. Customers expect to receive a high quality of service regardless of the type of network used to provide the service. However, calls may fail to be established and the signaling may timeout. The signaling timeout may be due to a fault in the network. Currently, the customer is expected to redial (i.e., send another request) when his/her request times out. However, if the timeout is due to a network fault, the outcome of subsequent redialing may not change and the service provider may not even be aware of the customer's experience. Frequent timeouts may decrease customer satisfaction with the service.

The current invention discloses a method and apparatus for providing detection and reporting of timeout events by network elements involved in call setup. When a customer subscribes to a VoIP service, the service provider records the customer's service profile in a database. The service provider then associates a signaling path for handling call setup messages received from the customer based on the network topology and the customer service profile. Generally, the signaling path is fixed and known for a particular customer. For example, when a CCE receives a SIP message from a customer, the CCE accesses a server that maintains a service profile for each customer. The CCE then identifies the appropriate application server(s) for servicing the customer's call setup message based on the customer's service profile. The CCE then either denies the request or routes the SIP message to the application server that has been identified.

When a network element, involved in the call setup, sends a signaling message to another network element, it originates a signaling message and begins waiting for a required response for the call to proceed. If there is no problem in the network, then the required response is received in a timely manner. For example, if a SIP request is sent, then a 200 OK response should be received.

However, when a network element involved in the call setup experiences a problem and fails to send a required response, the network element that originated the signaling message without receiving the required response will simply time out. This timeout is an indicator of a potential problem somewhere in the chain of the signaling flows, e.g., within the signaling call setup path. It is important to note that the timeout is not caused by the network element sending the call setup request, rather it is caused by another network element's failure to process the call setup signal. Some examples of failures that may cause timeouts are circuit failures, loose cables, memory failures (space), application failures, etc.

Figure 2:
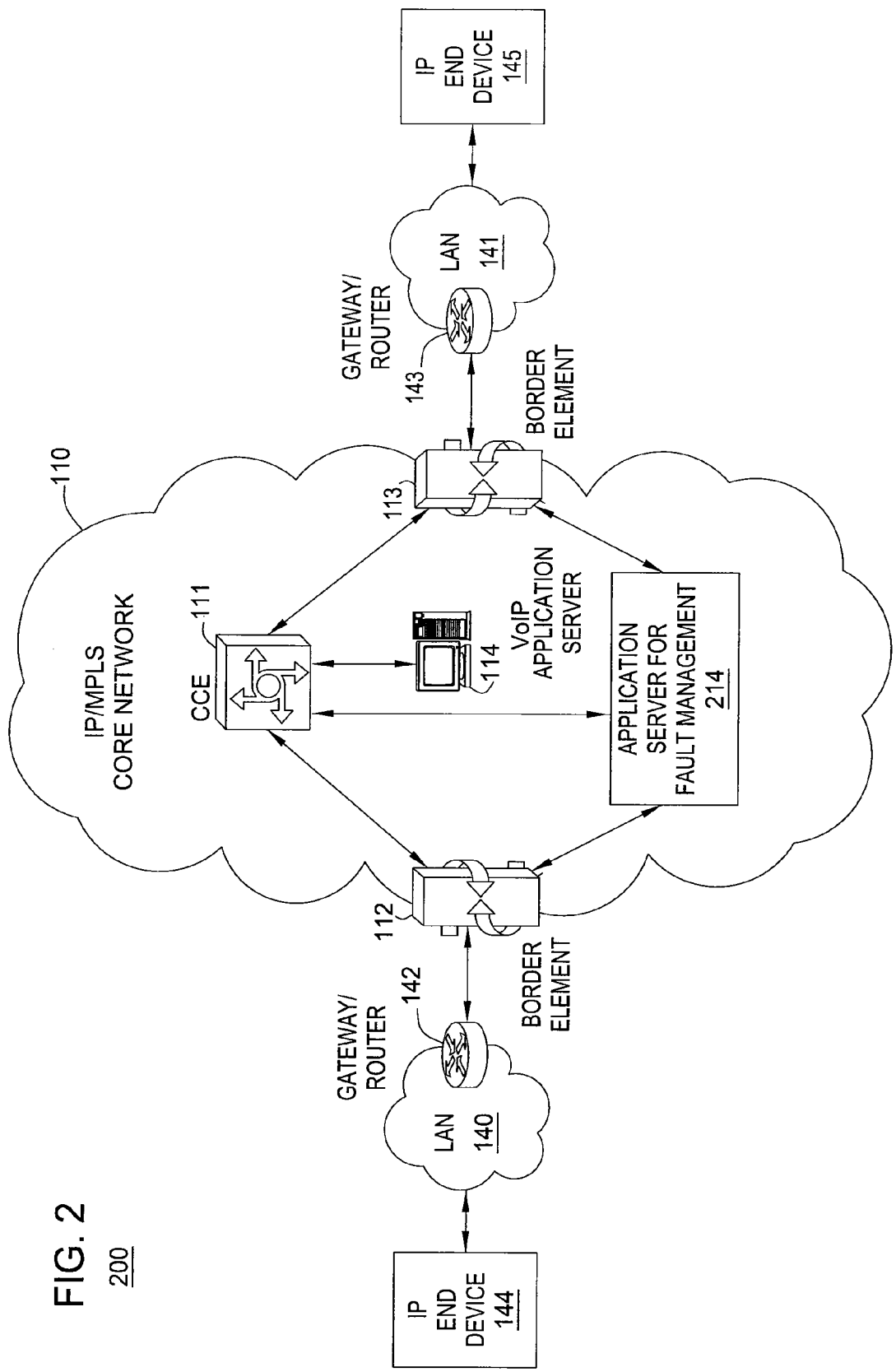
FIG. 2 illustrates an exemplary network with one embodiment of the present invention for detection and reporting of timeout events.

FIG. 2 illustrates an exemplary network 200 with one embodiment of the current invention for detecting and reporting of timeout events. In one embodiment, the service provider implements the current invention for detecting and reporting of timeout events in a fault management application server 214 located in a core network, e.g., an IP/MPLS core network 110. The service provider also enables networks elements such as border elements, call control elements, application servers, etc. that may be involved in setting up a call to detect and report signaling timeouts to the application server 214. In one embodiment, the service provider also establishes a threshold for reporting a number of timeouts per time interval. For example, the service provider may implement an algorithm in the network elements that determines whether or not the number of timeouts per hour exceeds a predetermined threshold, and reports the timeouts when the threshold is exceeded.

To illustrate, a customer is using IP device 144 to originate a call to another customer using IP device 145. During the call setup, a setup signaling message is sent from IP device 144 to BE 112 through the LAN 140 and the VoIP Gateway/Router 142. BE 112 then sends a setup signaling message, such as a SIP-INVITE, to CCE 111 and begins listening for a response from CCE 111. CCE 111 looks at the called party information and queries the necessary VoIP service related application server 114 to obtain the information to complete this call. In one embodiment, the Application Server (AS) functions as a back-to-back user agent. CCE 111 then sends another call setup message (a SIP-INVITE message) to BE 113 and begins listening for a response from BE 113. Upon receiving the call setup message, BE 113 forwards the call setup message towards the IP device 145 through the Gateway/Router 143 and LAN 141. BE 113 also begins listening for a response from IP device 145. If IP device 145 fails to respond to the SIP-INVITE message, BE 113 times out. If the number of timeouts for communicating with IP device 145 has reached the threshold, BE 113 reports the timeout to application server 214.

In one embodiment, the threshold for the number of timeouts in a given time interval is measured on a sliding time window. For example, if the threshold is 10 timeouts/hour. The 1-hour time may be measured as a sliding time window that discards timeouts over 60 minutes old.

In one embodiment, the timeout events reported by various network elements are correlated to identify a fault in the network. For example, if both BEs 112 and 113, report a timeout problem associated with communicating with CCE 111, the application server 214 may correlate the information to isolate the fault to CCE 111, to isolate the fault to a particular port on CCE 111, and so on.

In one embodiment, the timeout event may be correlated with other types of failures reported by various network elements and/or maintenance systems to identify one or more faults that may have caused the timeout. That means the signaling related failure data, such as data for timeouts during call setup, may be correlated with other fault symptoms received from other network elements and fault management/monitoring systems to provide detection and prediction of faults. For example, a port failure, a cable cut, etc. may have been reported.

In one embodiment, the fault management system (e.g., application server 214) may analyze timeouts for correlating the timeouts with other fault reports. Finally, the fault management system may also notify a ticketing system. For the above example, if a port on the CCE 111 is identified as causing the timeouts, then a ticket may be generated for the CCE such that a repair may be performed.

In one embodiment, the current invention dynamically changes the threshold for reporting timeouts in response to information from a fault management system. For example, if the fault management system is already aware of a congestion or failure problem, then it may be beneficial to increase the threshold for reporting timeouts, thereby reducing the probability of overwhelming the application server that is tasked with processing the received timeout reports.

In one embodiment, the current invention is able to set the threshold for reporting timeouts in a network wide manner for all network elements or on a per network element basis. In one embodiment, the threshold can be set for each source network element and destination network element pair. For example, a threshold of 10 timeouts per hour may be set for a border element to CCE communication, while 2 timeouts per hour may be set for an application server to CCE communication and so on.

Figure 3:
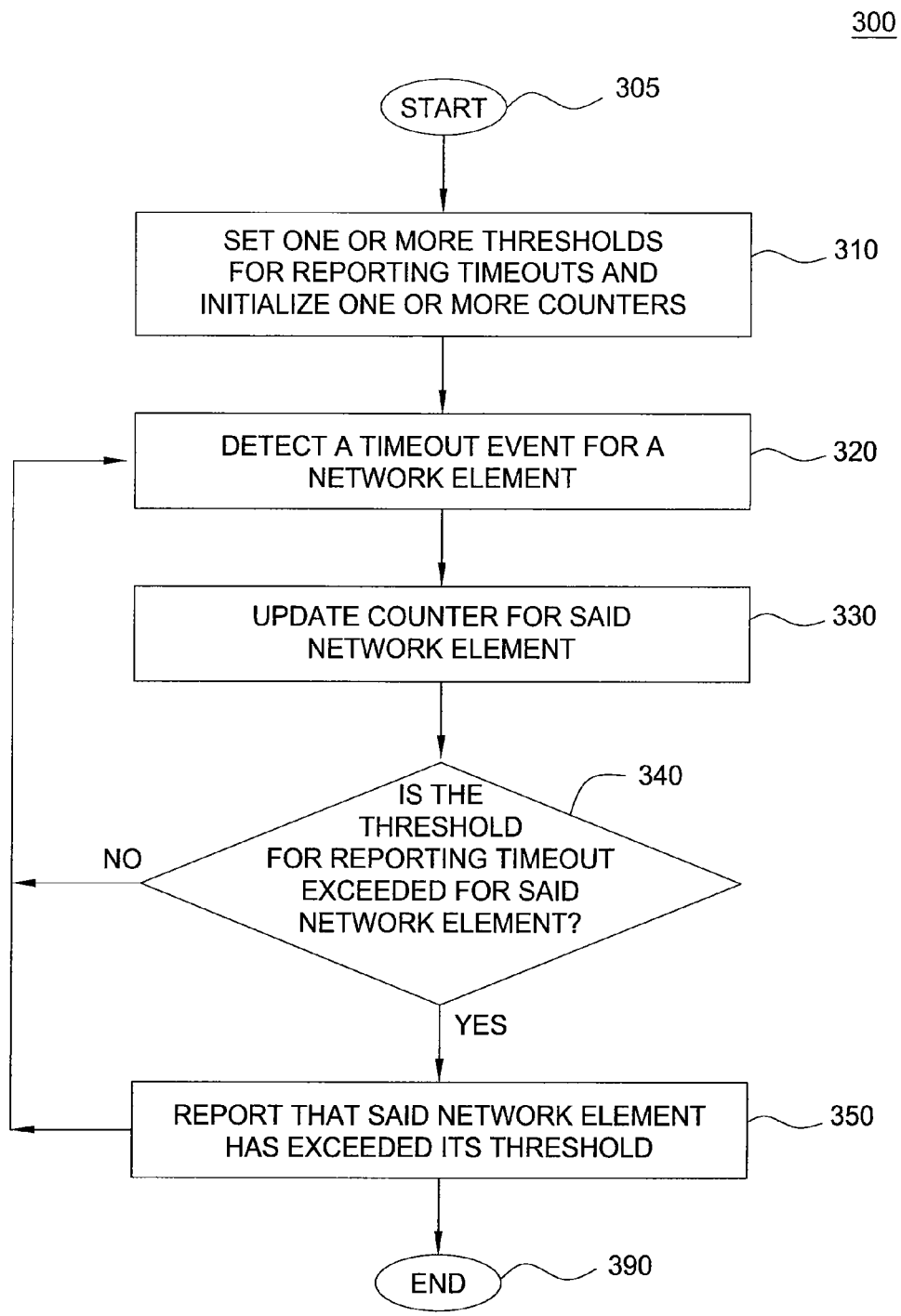
FIG. 3 illustrates a flowchart of a method for detecting and reporting timeout events.

FIG. 3 illustrates a flowchart of a method 300 for detecting and reporting timeout events. Method 300 starts in step 305 and proceeds to step 310.

In step 310, method 300 sets one or more thresholds for reporting timeouts and initializes one or more counters. For example, a fault management system may set thresholds in network elements such as BEs, CCEs, and application servers for reporting timeout events and initializes counters by setting counter values to zero. The method then proceeds to step 320.

In step 320, method 300 detects a timeout event for a network element. For example, a border element that sent a SIP-INVITE message to a CCE fails to receive a response of 200 OK.

In step 330, method 300 updates a counter at a relevant network element. For the above example, the BE updates the timeout counter maintained for communicating with the CCE by incrementing the counter value by 1.

In step 340, method 300 determines whether or not the threshold for reporting timeout is exceeded for a particular network element. For the above example, the border element determines whether or not the value of the timeout counter maintained for communicating with that particular CCE has exceeded the threshold set in step 310. If the threshold is exceeded, the method proceeds to step 350. Otherwise, the method proceeds back to step 320.

In step 350, method 300 reports (e.g., generating a report or a notification) that a particular network element has exceeded its threshold for the number of allowable timeouts for a predefined time duration. For the above example, the BE sends a report to a fault management system stating that a particular CCE has exceeded its threshold. The method then proceeds to step 320 to continue detecting timeouts or ends in step 390.

In one embodiment, the current method further performs analysis on the received timeout events and/or other fault reports to correlate the timeout events to a particular failure or problem. For example, the fault management system will attempt to correlate the timeout events to a particular known failure condition, e.g., a failed router, a failed switch, a failed CCE, a failed port, a failed application server, a cut cable, a severe congestion condition (e.g., triggered by a surge in legitimate call demand or by a denial of service attack) and the like.

Once the failure is identified, the current method may also provide input to a ticketing system such that remedial steps may be initiated. In one embodiment, the fault management system may modify the thresholds for reporting timeouts to minimize the timeout reports until the known failure has been addressed. For example, once the fault management system is able to determine a known cause that is triggering the numerous receptions of timeouts being reported by one or more network elements, the fault management system may temporarily increase the thresholds in the network elements that are reporting the timeouts. However, once the known failure has been addressed, the fault management system may return the thresholds to their default values in the network elements.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
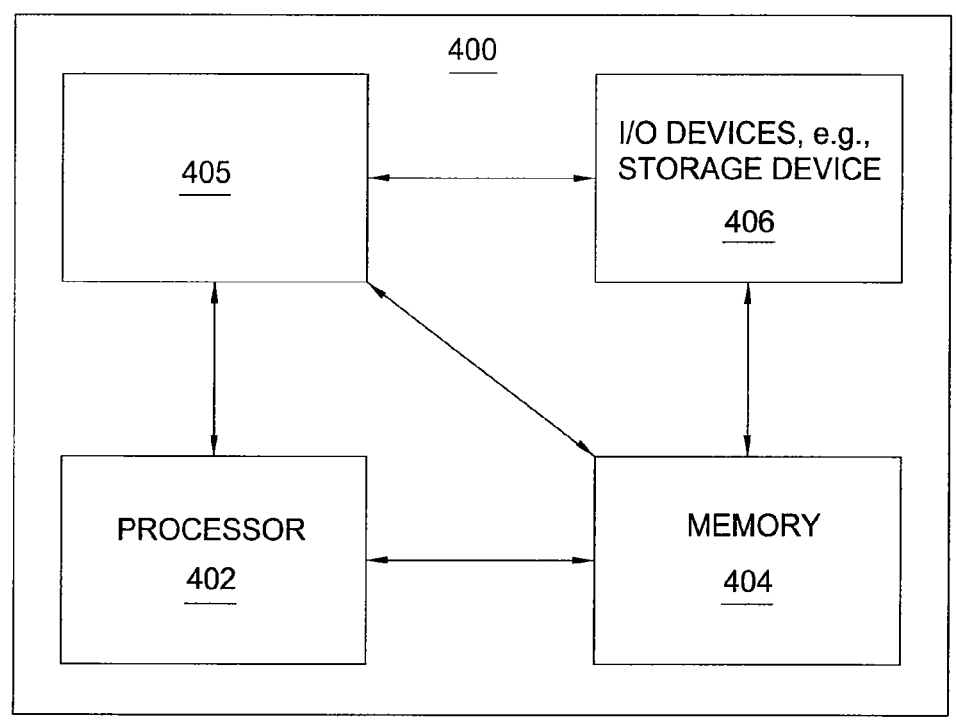
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for detecting and reporting timeout events on packet networks, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for detecting and reporting timeout events on packet networks can be loaded into memory 404 and executed by processor 402 to implement the functions as discussed above. As such, the present method 405 for detecting and reporting timeout events on packet networks (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing timeout events, comprising:
   detecting a timeout event by a first network element, wherein the timeout event is generated due to a lack of response from a second network element;
   determining whether a threshold for reporting of timeouts is exceeded for the second network element; and
   sending a report by the first network element to a fault management system if the threshold is exceeded, where the report indicates that the second network element has exceeded the threshold for reporting of timeouts, wherein the threshold is dynamically adjusted in response to the fault management system based on a known failure condition.

2. The method of claim 1, wherein the threshold is set in accordance with a pair of source network element and a destination network element.

3. The method of claim 1, wherein the threshold is based on a sliding time window.

4. The method of claim 1, wherein the first network element is a border element.

5. A non-transitory computer-readable storage medium having stored thereon a plurality of instructions, the plurality of instructions including instructions which, when executed by a processor, cause the processor to perform a method for processing timeout events, comprising:
   detecting a timeout event by a first network element, wherein the timeout event is generated due to a lack of response from a second network element;
   determining whether a threshold for reporting of timeouts is exceeded for the second network element; and
   sending a report by the first network element to a fault management system if the threshold is exceeded, where the report indicates that the second network element has exceeded the threshold for reporting of timeouts, wherein the threshold is dynamically adjusted in response to the fault management system based on a known failure condition.

6. The non-transitory computer-readable storage medium of claim 5, wherein the threshold is set in accordance with a pair of source network element and a destination network element.

7. The non-transitory computer-readable storage medium of claim 5, wherein the threshold is based on a sliding time window.

8. The non-transitory computer-readable storage medium of claim 5, wherein the first network element is a border element.

9. An apparatus for processing timeout events, comprising:
   a first network element configured to:
   detect a timeout event, wherein the timeout event is generated due to a lack of response from a second network element;
   determine whether a threshold for reporting of timeouts is exceeded for the second network element; and
   send a report to a fault management system if the threshold is exceeded, where the report indicates that the second network element has exceeded the threshold for reporting of timeouts, wherein the threshold is dynamically adjusted in response to the fault management system based on a known failure condition.

10. The apparatus of claim 9, wherein the threshold is set in accordance with a pair of source network element and a destination network element.

11. The apparatus of claim 9, wherein the threshold is based on a sliding time window.

12. The method of claim 1, wherein the first network element is a call control element.

13. The method of claim 1, wherein the first network element is an application server.

14. The method of claim 1, wherein the second network element is a border element.

15. The method of claim 1, wherein the second network element is a call control element.

16. The method of claim 1, further comprising:
   correlating the report to a reported failure.

17. The method of claim 16, further comprising:
   providing an input to a ticketing system in response to the reported failure.

18. The non-transitory computer-readable storage medium of claim 5, wherein the method further comprises:
   correlating the report to a reported failure.

19. The non-transitory computer-readable storage medium of claim 18, wherein the method further comprises:
   providing an input to a ticketing system in response to the reported failure.

20. The apparatus of claim 9, wherein the fault management system correlates the report to a reported failure.

* * * * *